US012031663B1

(12) United States Patent
Simon et al.

(10) Patent No.: US 12,031,663 B1
(45) Date of Patent: Jul. 9, 2024

(54) ARRAY WITH LATERAL MOVEMENT

(71) Applicant: Russ Bassett Corporation, Whitter, CA (US)

(72) Inventors: Trevor Simon, Lake Forest, CA (US); Sasha Johnson, Fullerton, CA (US)

( * ) Notice: Subject to any disclaimer, the term of this patent is extended or adjusted under 35 U.S.C. 154(b) by 634 days.

(21) Appl. No.: 16/800,190

(22) Filed: Feb. 25, 2020

Related U.S. Application Data

(60) Provisional application No. 62/981,134, filed on Feb. 25, 2020, provisional application No. 62/809,773, filed on Feb. 25, 2019.

(51) Int. Cl.
*F16M 11/06* (2006.01)
*F16M 13/02* (2006.01)

(52) U.S. Cl.
CPC ............ *F16M 11/06* (2013.01); *F16M 13/02* (2013.01)

(58) Field of Classification Search
CPC ............ F16M 11/06; F16M 13/02; B66F 1/06
USPC ..... 248/282.1, 284.1, 289.11, 291.1, 292.11, 248/917, 919, 921, 922, 923; 361/679.02
See application file for complete search history.

(56) References Cited

U.S. PATENT DOCUMENTS

| | | | | |
|---|---|---|---|---|
| 2,747,692 A | * | 5/1956 | Holmes | B62B 5/049 74/521 |
| 2,933,198 A | * | 4/1960 | Firestone | A61B 6/102 212/319 |
| 3,341,042 A | * | 9/1967 | Carder | B64F 1/322 187/244 |
| 3,904,853 A | * | 9/1975 | Shoup | B66F 7/0625 312/272.5 |
| 3,964,738 A | * | 6/1976 | Owen | B25B 5/06 269/236 |
| 5,379,977 A | * | 1/1995 | Ronn | B66F 7/0666 248/327 |
| 5,758,849 A | * | 6/1998 | Bui | A47B 21/02 248/421 |
| 6,905,101 B1 | * | 6/2005 | Dittmer | F16M 11/10 248/125.7 |
| 7,516,977 B2 | * | 4/2009 | Wu | A61G 5/045 280/47.38 |
| D606,977 S | * | 12/2009 | Privett | D14/224 |
| 7,648,112 B2 | * | 1/2010 | Wu | F16M 11/045 248/289.11 |
| 7,878,476 B2 | * | 2/2011 | Carson | F16M 13/02 248/920 |

(Continued)

FOREIGN PATENT DOCUMENTS

| | | | | |
|---|---|---|---|---|
| CH | 649241 A | * | 5/1985 | ............. A61G 13/02 |
| CN | 3108552 A1 | * | 7/2017 | |

(Continued)

*Primary Examiner* — Kimberly T Wood
(74) *Attorney, Agent, or Firm* — The Law Office of Austin Bonderer, PC; Austin Bonderer

(57) ABSTRACT

A lateral hinge that allows space saving and greater movement is disclosed. The lateral hinge has a structure, a foundation and a support system that couples the structure and the foundation. The support system has two or more movement arms that are coupled to the structure, and each movement arm is coupled to a movement element. The two support arms move in the support plane. The movement arms move in the movement plane. The movement plane and the support plane intersect. The structure can be curved and hold multiple monitors.

12 Claims, 9 Drawing Sheets

(56) References Cited

U.S. PATENT DOCUMENTS

| | | | | |
|---|---|---|---|---|
| 7,950,613 B2* | 5/2011 | Anderson | | F16M 11/10 248/922 |
| 8,888,062 B2* | 11/2014 | Novin | | F16M 11/12 361/679.01 |
| 9,004,430 B2* | 4/2015 | Conner | | H04N 5/655 248/920 |
| 9,247,861 B2* | 2/2016 | Kan | | H04N 5/655 |
| 9,266,704 B1* | 2/2016 | Hall | | B66F 3/22 |
| 9,441,784 B2* | 9/2016 | Russell | | F16M 13/02 |
| 9,746,124 B2* | 8/2017 | Smed | | F16M 11/10 |
| 2002/0179791 A1* | 12/2002 | Kwon | | F16M 13/02 248/284.1 |
| 2002/0185637 A1* | 12/2002 | Enochs | | B66F 7/0666 254/362 |
| 2005/0152102 A1* | 7/2005 | Shin | | F16M 13/02 361/679.29 |
| 2007/0221807 A1* | 9/2007 | Park | | F16M 11/2014 248/324 |
| 2008/0237424 A1* | 10/2008 | Clary | | F16M 11/046 248/283.1 |
| 2010/0270447 A1* | 10/2010 | Nejah | | B60R 11/0223 248/205.1 |
| 2012/0241698 A1* | 9/2012 | Swasey | | B66F 3/22 254/122 |
| 2013/0056601 A1* | 3/2013 | Stemple | | F16M 11/10 16/322 |
| 2014/0245932 A1* | 9/2014 | McKenzie, III | | A47B 21/02 108/50.01 |
| 2015/0300560 A1* | 10/2015 | Matsuoka | | A47B 23/025 5/503.1 |
| 2018/0051458 A1* | 2/2018 | Matsuoka | | E04H 15/50 |

FOREIGN PATENT DOCUMENTS

| | | | | | |
|---|---|---|---|---|---|
| CN | 107835914 | A | * | 3/2018 | F16M 11/04 |
| EP | 1586803 | A2 | * | 10/2005 | F16M 11/04 |
| EP | 1837583 | A2 | * | 9/2007 | F16M 11/10 |
| EP | 20100119917 | A | * | 9/2007 | F16M 11/10 |
| FR | 2310954 | A | * | 1/1977 | B66F 7/0633 |
| GB | 2213795 | A | * | 8/1989 | F66F 7/0633 |
| KR | 2021121431 | A | * | 10/2021 | F16M 13/02 |
| NL | 9100855 | A | * | 12/1992 | A61B 6/04 |

* cited by examiner

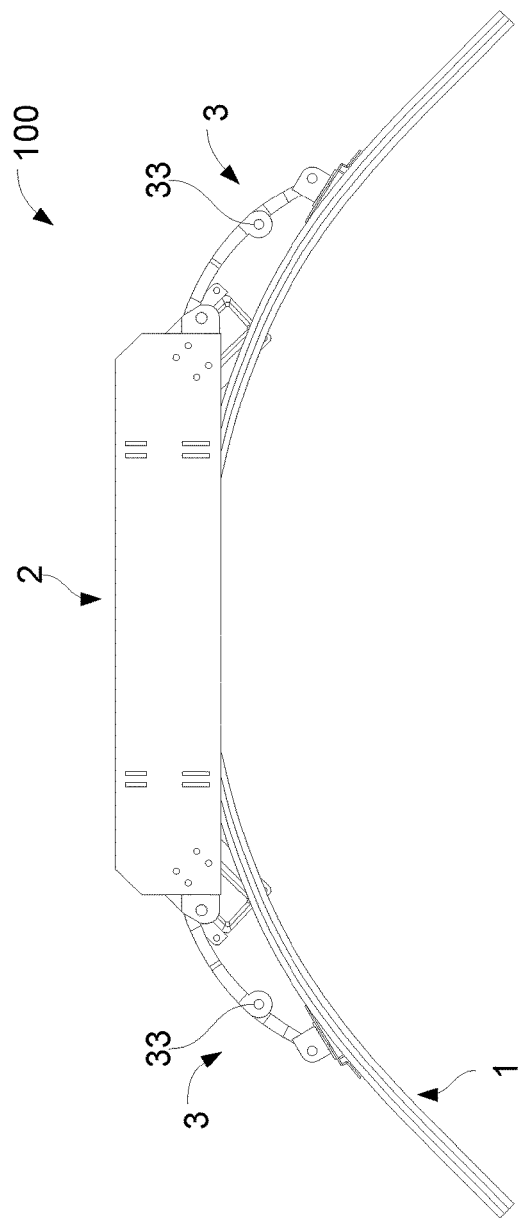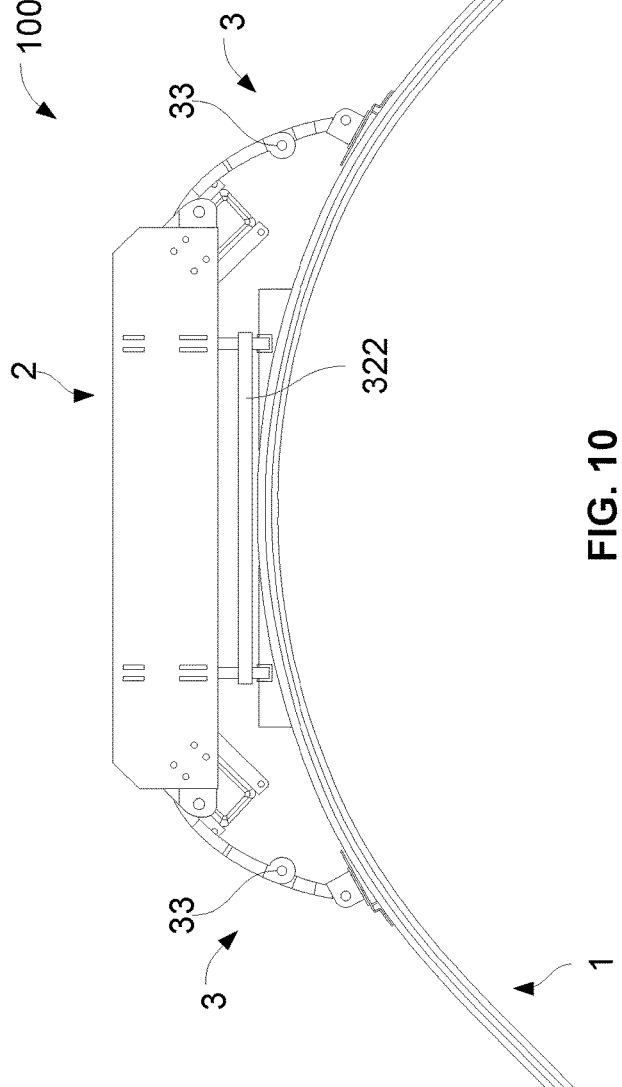

ARRAY WITH LATERAL MOVEMENT

FIELD

The subject matter herein generally relates to arrays for securing multiple monitors.

BACKGROUND

In the area of ergonomic design where multiple monitors are required, a goal is to have relatively equal focal distance and perpendicular viewing to each monitor per HFES and BIFMA ergonomic guidelines. One solution for this is to have a multiple-monitor array, and sometimes these arrays are arranged in an arc about the user. As is the case with a single monitor, each user typically has a desired distance between themselves and the monitors for comfortable viewing. In multi-user environments, such as 24/7 control rooms, that distance needs to be adjusted quickly each time a different operator occupies the space. Providing an ability to easily move the array of monitors without overcrowding one's workspace and/or consuming much space has proven to be very difficult.

The most common approach for focal depth adjustment on monitor arrays or other heavy loads is to use linear motion devices such as drawer slides or guide bearing systems. However, many issues can be found in the designs of the prior art. For one, they require too much depth for the motion provided. For example, a 12" stroke would require a telescoping mechanism that is 12" long or longer. A non-telescoping solution would need to be perhaps 1.5 times the length. These designs protrude into the user's space and consume valuable desk space or office space. Even when the array is in a fully retracted position, the desk or in the office space required is greater or equal to the length of movement, e.g., a foot of space is required to hold the arms that will provide for a foot of movement.

Furthermore, telescoping solutions are not rigid enough to support hefty loads without deflection due to the torque created. Deflections are unacceptable as the monitor array supports will not properly align and may encounter the work surface causing damage and/or preventing movement. Current slides are limited in how far apart they can be spaced based on their length due to moments created by uneven force. When supporting a wide structure with a shallow stroke and shallow slides, typically one of two things can happen. The first is to place the slides close together (no wider apart than the slides are long), which will provide stable movement but will not provide support for the ends of the long structure and result in a rotational moment in two planes. The second is to move the slides outward to better support the ends of the structure. However, this will undoubtedly introduce racking in the system. For example, one cannot space 12" slides 4' or 6' apart because this would create excessive racking (one side moves before the other). Therefore, supporting beams that are 8' or 10' wide would require even deeper slides to prevent racking, or be placed closer together but suffer more deflection at the left and right ends of the beam. It is generally desirable to have a narrower structure on the desk for the sake of limiting the desk space used.

In order to allow for the longevity of the design and safety of the users, it is crucial that a design not allow any significant side-to-side movement or create an angle during linear actuation, e.g., racking. Furthermore, in order to be desirable, the design must provide for a range of movement while still being compact.

BRIEF DESCRIPTION OF THE DRAWINGS

Implementations of the present technology will now be described, by way of example only, with reference to the attached figures, wherein:

FIG. 9 shows an embodiment of an array support from the top in a retracted position.

FIG. 10 shows an embodiment of an array support from the top in an extended position.

DETAILED DESCRIPTION

Figure 1:
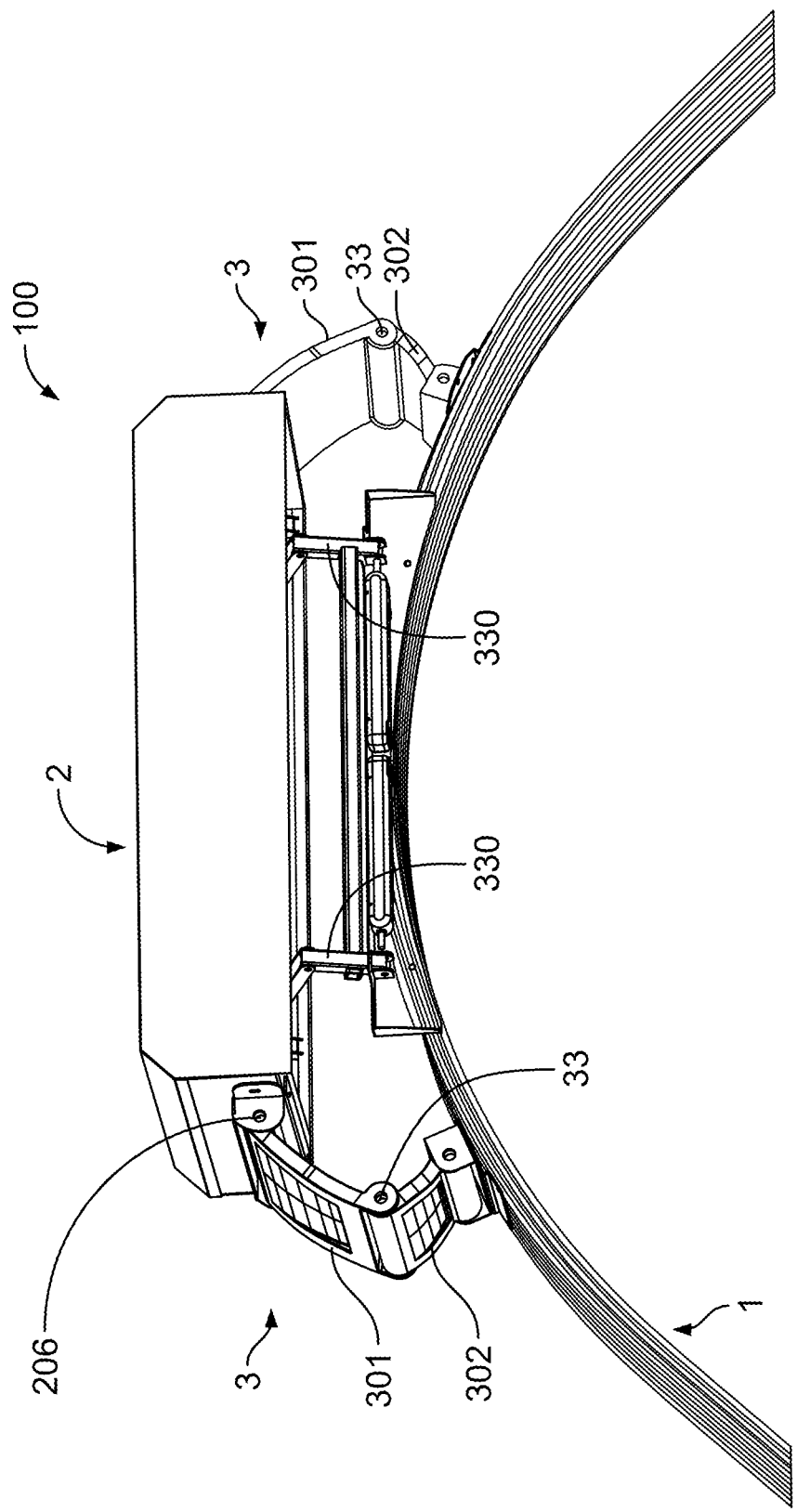
FIG. 1 shows an embodiment of an array support from a bottom perspective view.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "electrically coupled" is defined as being in electrical contact, whether directly or indirectly through intervening components, to allow the flow of electrons or other signals (e.g., fiber optic) between the respective elements. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a device that allows for linear movement of a structure 1. The structure 1, in some embodiments, will serve as a mounting base for multiple monitors arranged along an arc of the structure 1. In some embodiments, the structure 1 will be linear, curved, have a consistent curve, multiple curves, and/or be at least partially linear. The multiple monitors can be arranged along the structure 1.

Figure 2:
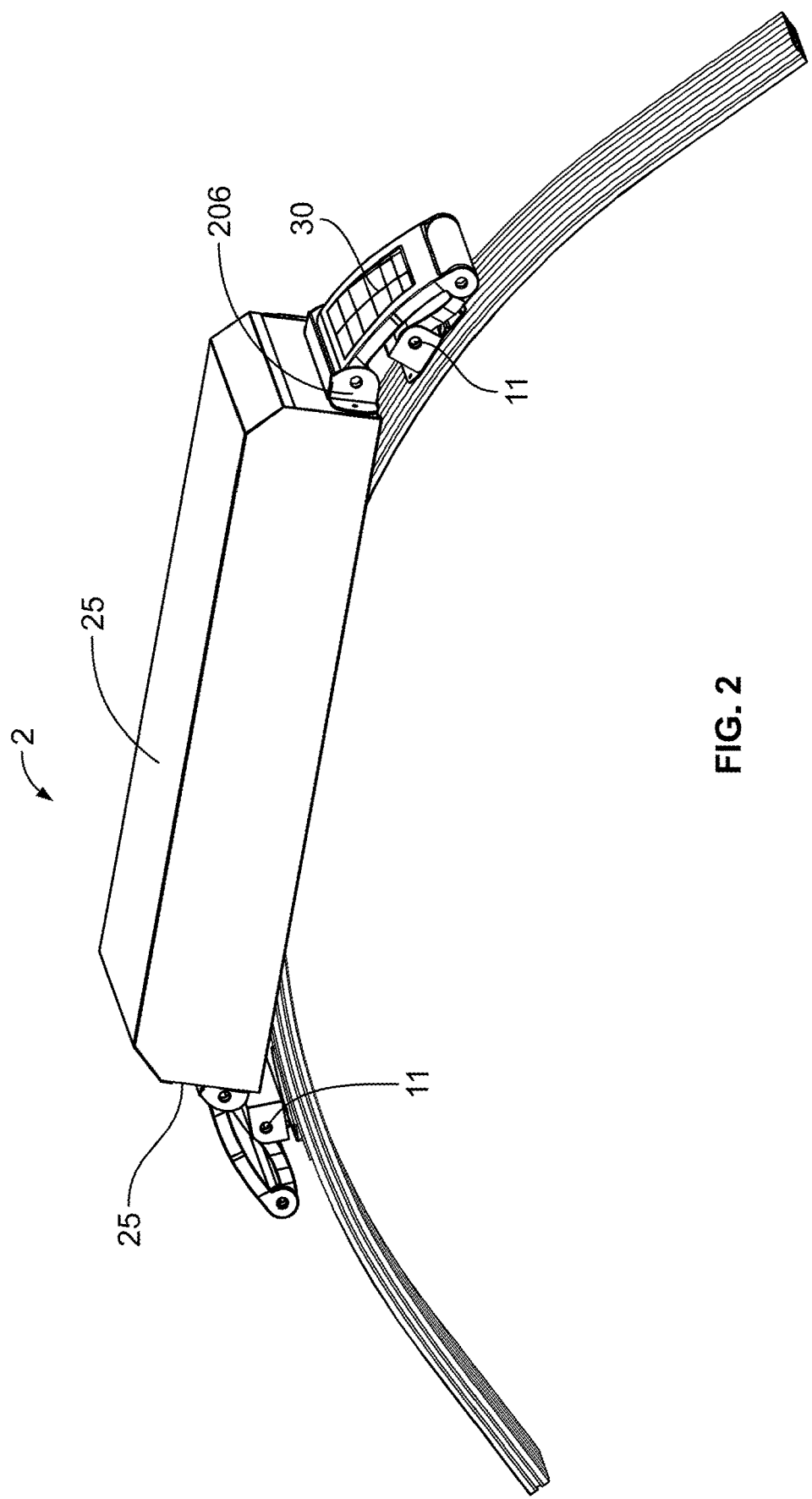
FIG. 2 shows an embodiment of an array support from a perspective view.

FIGS. 1 and 2 illustrate embodiments of the array support 100 in a partially extended position and retracted position. The array support 100 comprises a structure 1, a foundation 2, support system 3. As stated above structure 1, can have many different, shapes, curvatures, lengths and/or be straight. In some embodiments, the structure 1 comprises a parabolic curve. In some embodiments, the structure 1 defines a parabolic curve located about a focus, and the focus can be predetermined as to where an intended viewer is meant to be. In some embodiments, the determination of the focus considers the monitors that are to be coupled to the structure 1 to find the substantial focus of the array of monitors. In some embodiments, the curvature of the structure 1 will be based on the width of the intended monitors, the intended spacing between adjacent monitors and/or the number of monitors desired. The more and/or less wide the monitors, the greater the curvature can be accommodated. It is also understood that monitors within the array can be of varying size. It is also understood that items attached to the structure 1 is not limited to monitors.

In some embodiments, the structure 1 can comprise a slatwall design on the front and/or backside. In other embodiments, the structure 1 comprises one or more tubes, plates, and/or beams. In some embodiments, the structure 1 comprises an element that is able to support the weight of the items that are intended to be attached thereto regardless of the shape. In some embodiments, the structure 1 will define a cable space 112 (seen in FIG. 5), such that cables can be run and located within the cable space 112 to the individual monitors. In some embodiments, several holes (not shown), defined in the structure 1, are in communication with the cable space 112 to allow cables to be run through the structure 1, out the holes, and electrically couple the monitors and/or other items. The monitors, and/or other items, will be electrically coupled to power sources and/or information sources. In some embodiments, the cable space 112 is fully encircled, and in other embodiments, a gap runs along, some or all, the structure 1, such that cables can be inserted into the cable space 112. In some embodiments, the monitors are electrically coupled to data and power sources.

In some embodiments, the support system 3 comprises two support arms 30. The support arms 30 provide for linear movement of the structure 1 and pivot within a support plane. The support plane can be the horizontal plane. Both support arms 30 can comprise a first segment 301. In some embodiments, each support arm 30 comprises a first segment 301 and a second segment 302. The support system 3 can bear some, if not all, of the weight of the structure 1 and items attached thereto.

In some embodiments, the length of first segments 301 can be the same. In some embodiments, the length of the second segments 302 can be the same. In some embodiments, the segments 301 and/or 302 comprise a segment curvature. The radius of the curvature of each segment can be the same or varied. In some embodiments, the segment curvature(s) need not have a consistent radius. In some embodiments, the segment curvature of the first segments 301 and the segment curvature of the second segments 302 can match. In some embodiments, the first segments 301 are coupled to the foundation 2 and the second segments 302, and the second segments 302 are further coupled with the structure 1. In some embodiments, the second segments 302 are coupled to a structure joint 11 which is coupled to the structure 1. In some embodiments, the first segments 301 are coupled to a foundation joint 206 which is coupled to the foundation 2. In some embodiments, the first segments 301 are coupled to the second segments 302 by segment joints 33 that allow for movement of the segments 301 and 302 relative to each other. The foundation joints 206, segment joints 33, and structure joints 11 can be load-bearing joints. In some embodiments, one or more of the foundation joints 206, segment joints 33, and structure joints 11 will allow only a preset range of movement. In some embodiments, the one or more of the foundation joints 206, segment joints 33, and structure joints 11 comprise bearings, e.g., ball or roller, at the joints to allow for quiet and smooth movement.

In some embodiments, the first segments 301 extend out from the foundation 2, and the segment curvature thereof extends back toward the foundation 2. Having segments 301 extend out from the foundation 2 can allow for the greater retraction of the structure 1 relative to other designs. In some embodiments, the second segments 302 have a curvature that extends toward the foundation 2. In some embodiments, the second segments 302 have a curvature that extends away from the foundation 2 and allows the second segments 302 to move closer to the first segments 301 when in a fully retracted position.

As is also shown in FIG. 2 is an embodiment of the array support 100 in the retracted position. As can be seen, because the segments 301 are located on the periphery of the foundation 2 and extend out therefrom, the design allows for a high degree of movement. If the segments 301 extend inward toward the foundation 2, like the prior art, the thickness of the segments 301 limits the movement as they will abut the foundation 2. By having the segments 301 extend outward, the structure 1 is able to retract closer to, abut the foundation 2, and/or move inside the foundation housing 25. Additionally, having the segments 301 extend out from the outside the foundation housing 25 allows for the structure joint 11 to be located further out from the center of the structure 1. This arrangement helps to prevent rotational movement, e.g., racking, of the structure 1. It is understood that the closer the connection to the center of the structure 1 that the support members are attached, the more the connections can act as a pivot point in two different planes. In some embodiments, the first segments 301 are curved to substantially match the curvature, in the locations where they will be near, of the structure 1. In some embodiments, the second segments 302 will substantially match the curvature of the structure 1 as well as the first segments 301.

Figure 3:
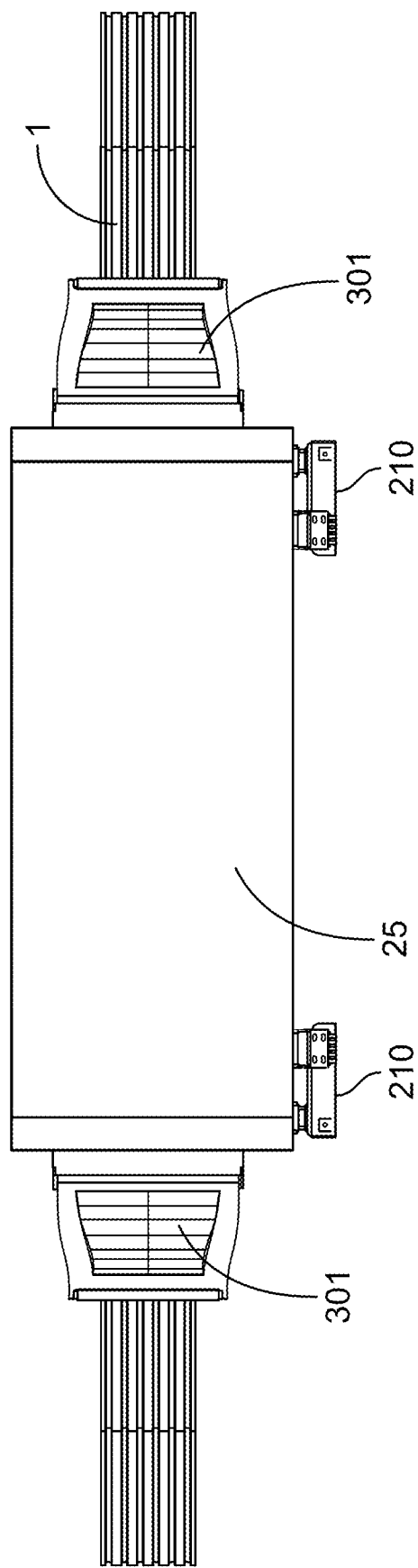
FIG. 3 shows an embodiment of an array support from the rearview.

FIG. 3 illustrates an embodiment of the array support 100. The array support 100 in use, can be coupled to something relatively stationary, whether be it the floor, a desk, a wall, or another object. In some embodiments, footings 210 are present and can be coupled to a stationary object. It is also understood that the foundation housing 25 can be coupled to a non-stationary object. In some embodiments, the foundation 2 can be coupled to a slat wall. In some embodiments, the foundation 2 is coupled to a post. In some embodiments, the foundation 2 defines one or more keyhole openings. In some embodiments, the foundation 2 defines one or more double keyhole openings. In some embodiments, the foundation 2, without a foundation housing 25, can be coupled directly to an object.

In some embodiments, there is a need to support heavy loads, control front-to-back motion in a very compressed space and be capable of working with actuators as well so that both height and depth adjustment are possible. Thus, in some embodiments, the footings 210 are capable of vertical movement, by a linear actuator that extends in the vertical direction, allowing for the vertical adjustment of the structure 1. In some embodiments, the vertical movement is caused by powered actuation. In other embodiments, the vertical movement is manually caused by a hand crank or counterbalance spring. The vertical movement can be accomplished by telescoping elements within the footings 210 or attached to the footings 210. In some embodiments, the footings 210 may have a gear that runs along a track of a vertical post.

Figure 4:
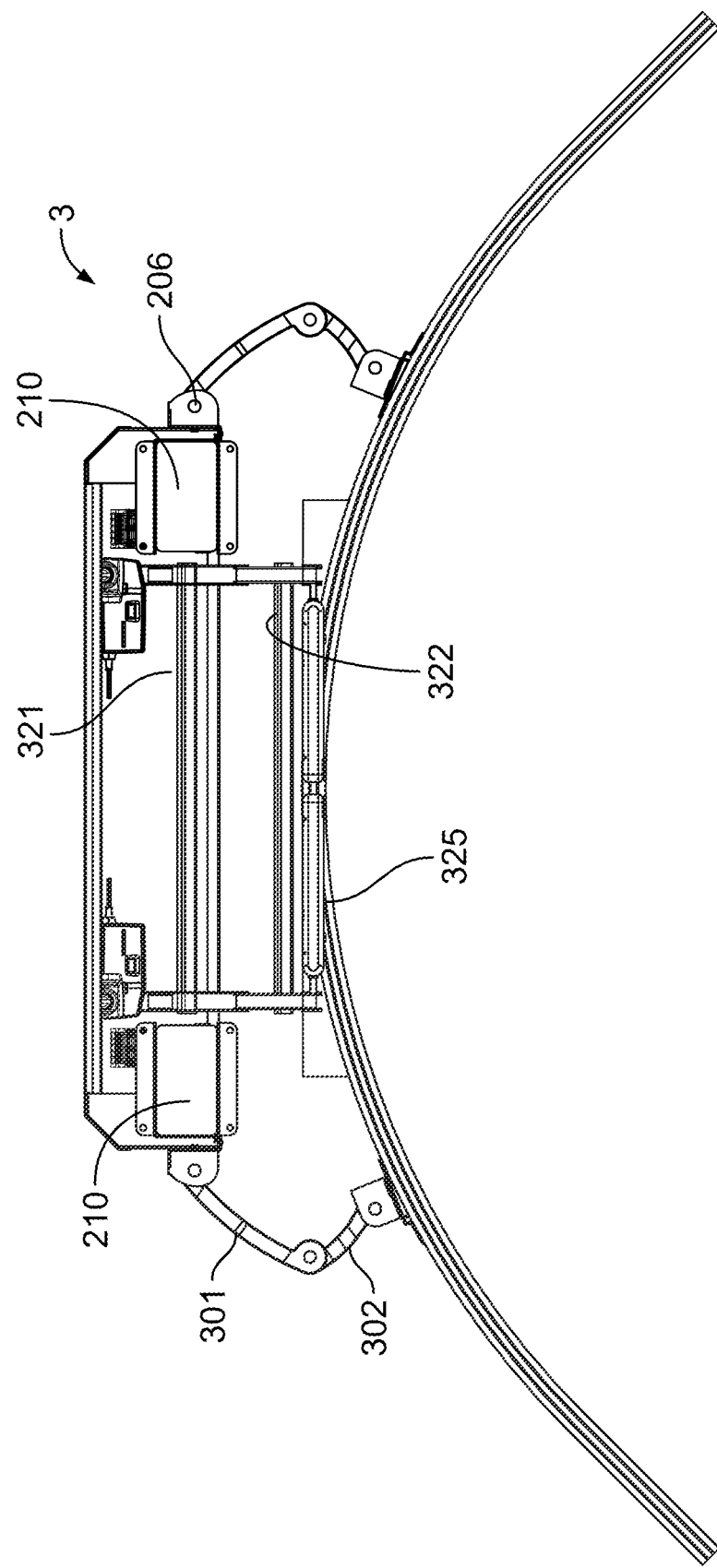
FIG. 4 shows an embodiment of an array support from a bottom view

FIG. 4 illustrates an embodiment of the array support 100 viewed from the bottom. In some embodiments, the foundation 2 will comprise one or more supply strips 325 that can help provide power and/or signal communications to equipment that can be mounted on the structure 1. In some embodiments, the supply strip(s) 325 is kept adjacent the structure 1 as it moves, and this will help prevent loose cables. In some embodiments, the monitors and/or other devices can be electrically coupled to the supply strips 325.

Figure 5:
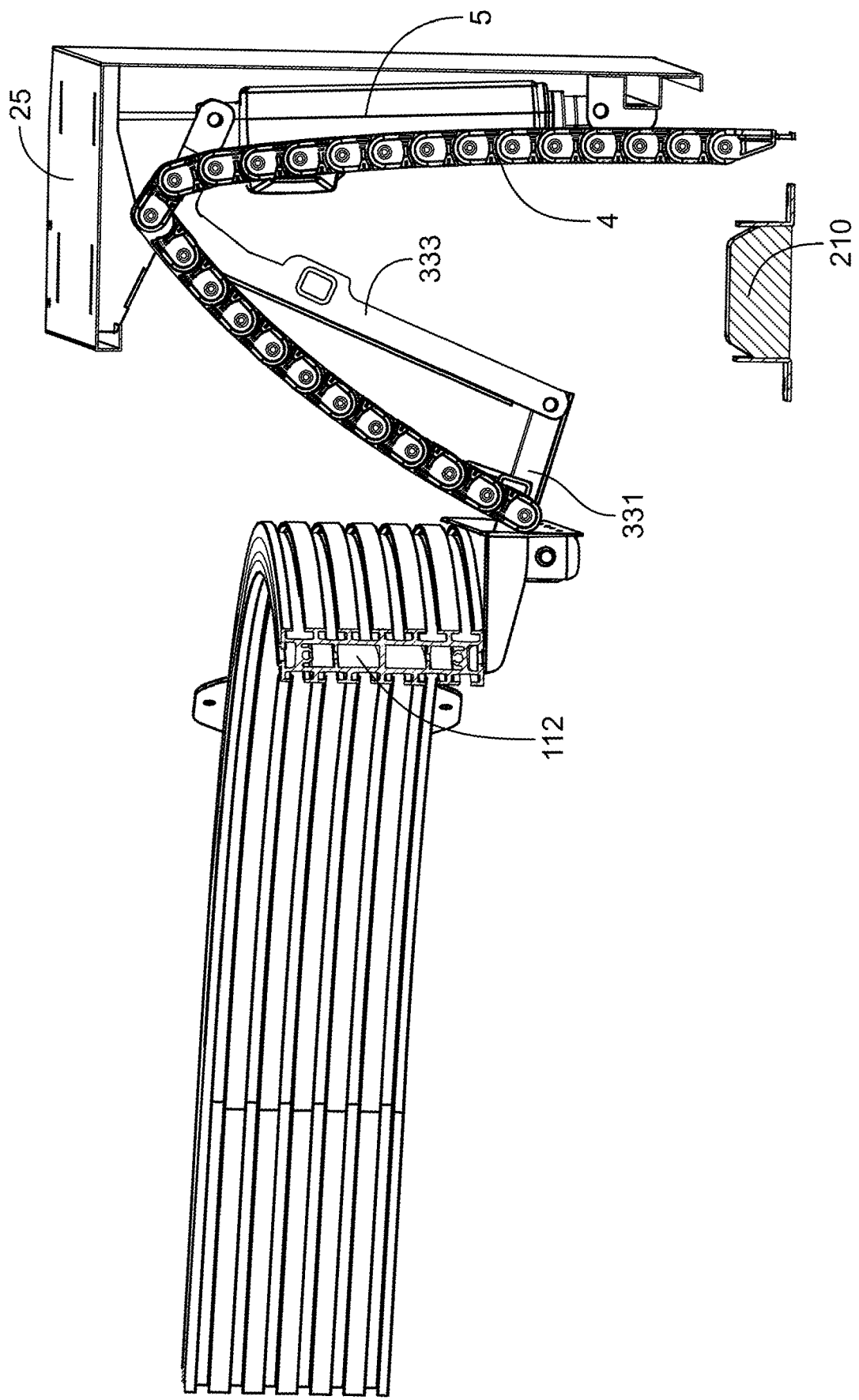
FIG. 5 shows cross-section an embodiment of an array support.

As can also be seen in FIGS. 4 and 5, is a view of the array support 100 in an extended position. In some embodiments, when the array support 100 is moved from a retracted position to an extended position, the segments 301 will rotate about the joints, the movement arms 330 will rotate about the actuation links 333 and the connection with the structure 1, the actuation links 333 rotate in relation to the movement element 5; and the movement element 5 will rotate in relation to the housing. In some embodiments, the movement is to be caused by the user pushing or pulling, and the desired position is to be held by the movement element 5. The stabilization bars 320 (labeled in FIG. 6) will help prevent torquing the apparatus given that most users will rarely apply pressure to the exact dead center of the apparatus. If the pressure is applied unevenly, a moment will be spread along the one or more stabilization bars 320 to cause simultaneous movement of the other movement system to maintain a substantially linear movement. In some embodiments where the movement element 5 applies the force for movement, if there is uneven pressure applied by the movement elements 5, the one or more stabilization bars 320 will help transfer the uneven force so that the movement remains substantially linear.

As seen in FIG. 5, in some embodiments, the array support 100 comprises one or more cable organizers 4 that can be coupled to one or more supply strips 325. In some embodiments, the cable organizers 4 comprise a cable management feature, e.g., drag chain and cable chain.

Figure 8:
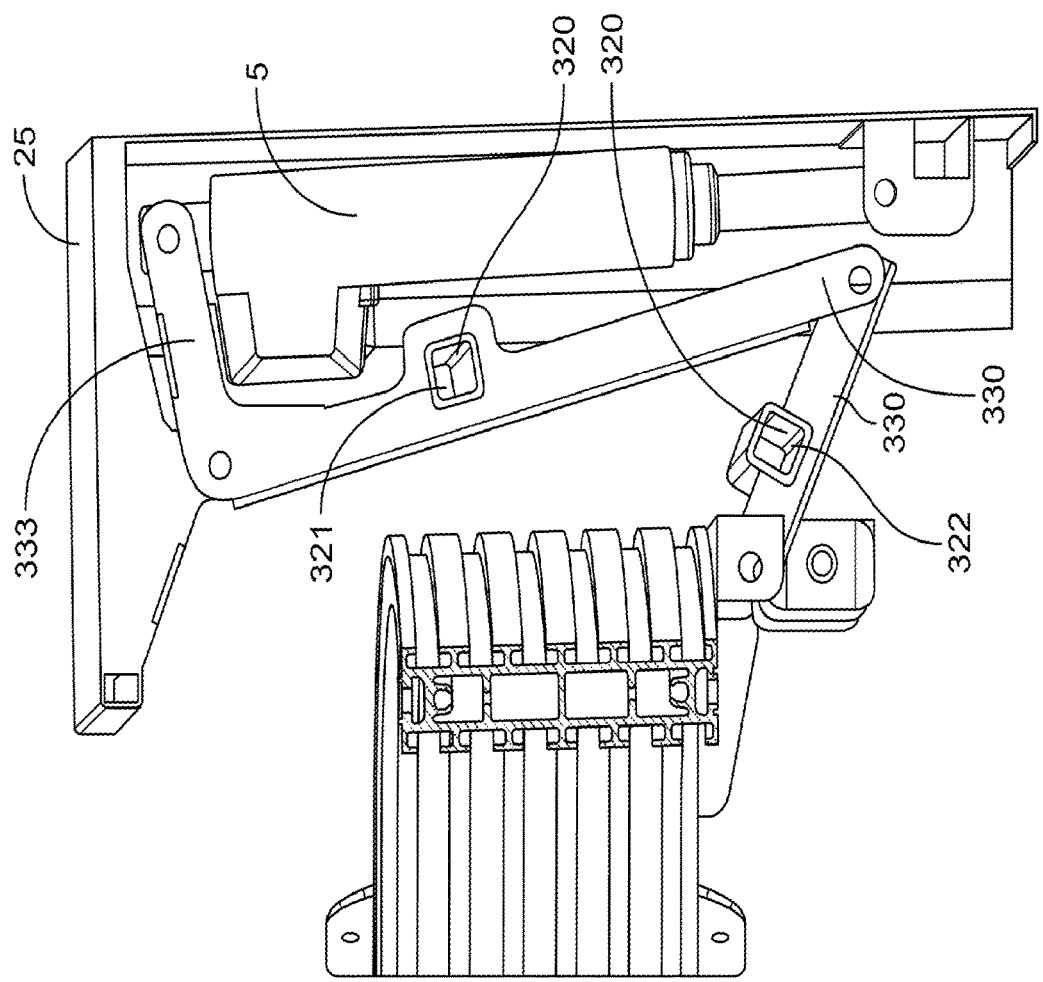
FIG. 8 shows a cross-section of an embodiment of an array support.

As seen in FIGS. 5 and 8, the support system 3 also comprises a movement system comprising of movement arms 330 that are coupled to one or more movement elements 5. The movement arms 330 pivot in a movement plane and can provide the pushing, pulling and/or retaining force to move and/or keep the structure 1 in the desired position. In some embodiments, the support plane and the movement plane intersect. In some embodiments, the support plane and the movement plane are perpendicular to each other. In some embodiments, the movement arms 330 comprise transfer links 331 and actuation links 333. The transfer links 331 are coupled to the structure 1 and the actuation links 333. The actuation links 333 can transfer force to the transfer links 331 that results in linear movement and/or prevent linear movement of the structure 1.

FIG. 8 illustrates an embodiment of the array support 100. In some embodiments, the array support 100, comprises one or more movement elements 5. In some embodiments, the movement element 5 comprises an actuator. The actuator can apply force to one or more actuation links 333. In some embodiments, the movement element 5 comprises an actuator that can apply a linear force to the movement arm 330 to extend and retract the structure 1 as desired. In some embodiments, the movement element 5 is a powered actuator comprising a motor, a pump, magnetic elements, and/or hydraulics. In some embodiments, the actuation link 333 is a bell crank. The ratios of the arms of the bell crank as well as the power of the actuator can be adjusted as desired for the amount of force, speed, and/or another variable that will be desired in the movement of the structure 1. The support system 3 further comprises one or more stabilization bars 320. In some embodiments, the stabilization bars 320 comprise an actuation link stabilization bar 321, that connects two or more actuation links 333, and/or a transfer link stabilization bar 322, that connects two or more transfer links 331. In some embodiments, there are two transfer links 331, that are coupled by a transfer link stabilization bar 322, and two actuation links 333, that are coupled by an actuation link stabilization bar 321. The one or more stabilization bars 320 help to prevent uneven lateral movement of the movement arms 330, which in turn will help prevent rotation, e.g., racking, and/or another unwanted movement of the structure 1. It is understood that one or more stabilization bars 320 can be attached to any part of the two support arms 30.

In some embodiments, the movement elements 5 can comprise a hand crank, an ACME screw system, pistons, motors, and/or counterbalance spring systems.

In some embodiments, the support system 3 bears most, if not all, of the weight of the structure 1 and any items attached thereto, and the movement arms 330 provide the resistance to non-linear movement, racking, and/or angling of the structure 1. The movement arms 330 can also transmit movement to the structure 1 resulting in movement of the array support 100 from the recessed position to the extended position. The size and strength of the support system 3 can be varied according to need in order to prevent unacceptable deflection given the space requirements.

Figure 6:
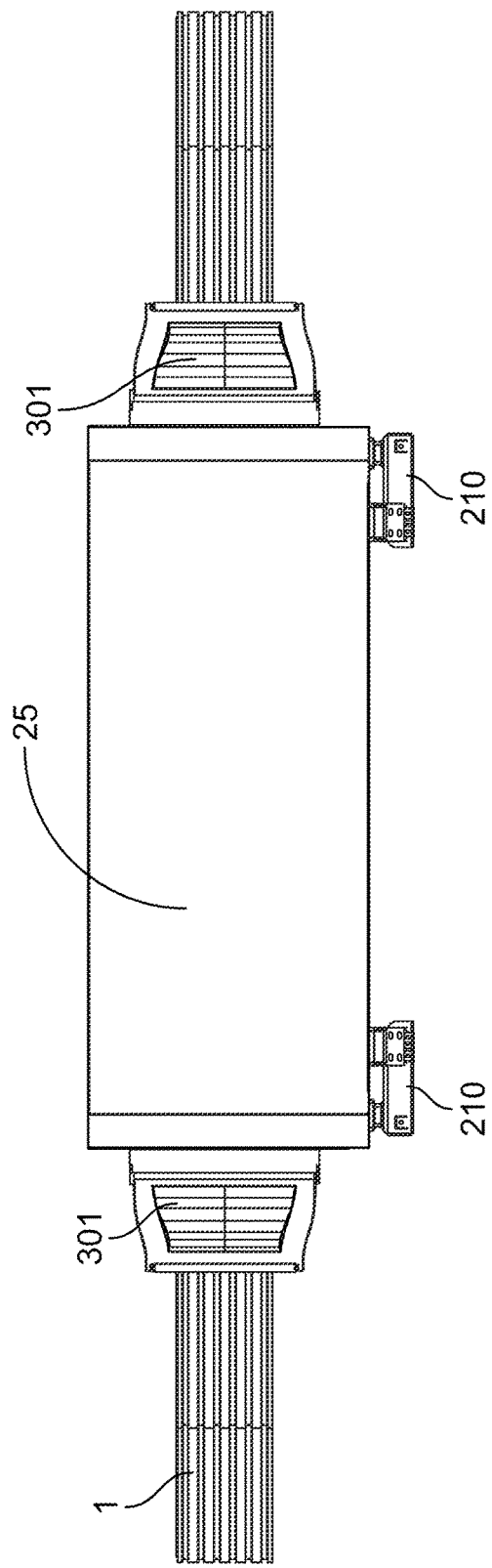
FIG. 6 shows an embodiment of an array support from the rear.

FIG. 6 illustrates an embodiment of the array support 100 shown in an extended position.

Figure 7:
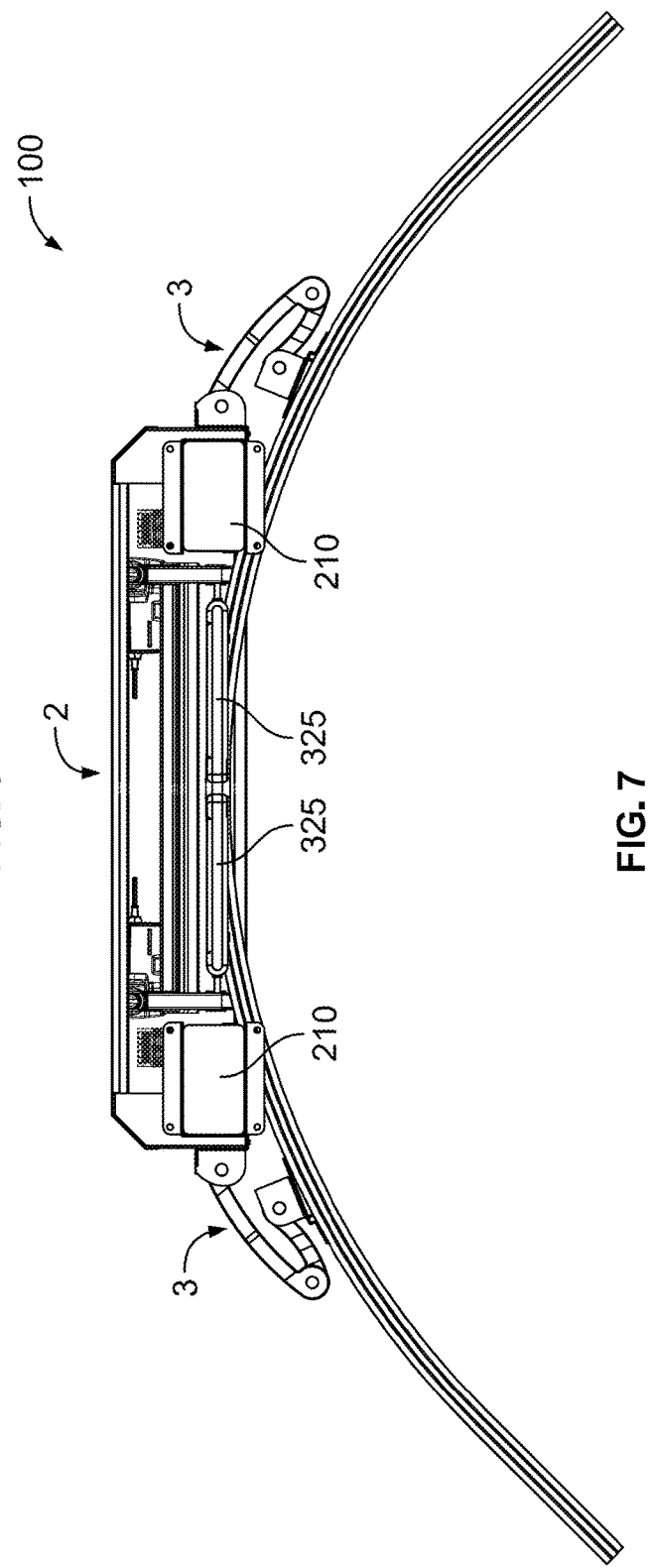
FIG. 7 shows an embodiment of an array support from the bottom.

FIG. 7 illustrates an embodiment of the array support 100 shown in a retracted position.

FIGS. 9 and 10 show an embodiment, in a retracted and a partially extended state, where the structure joints 11 are further apart than previously shown embodiments. The structure joints 11 are positioned so that both the first segments 301 and the second segments 302 are hinging outward. By extending the location of the structure joints 11, the load capacity of the array support 100 can be increased and/or greater range of linear movement provided as there is no need for the second segment 302 to rotate toward the interior. When the second segments 302 are folded in, the thickness of the second segments 302 can limit the range of motion. In some embodiments of the array support 100, a single segment can extend from the foundation 2 to the structure 1.

In some embodiments, the array support 100 will provide for limiting the range of motion. Stops (e.g., elastic elements, non-elastic elements) can be located in strategic locations and be of desired sizes to limit the movement of the one or more segments 301. In some embodiments, the shape of the various elements, e.g., the segments 301 and/or the foundation 2, will provide for limiting the range of motion. In some embodiments, the segment joints 33 comprise stops that are capable of limiting movement.

Figure 11:
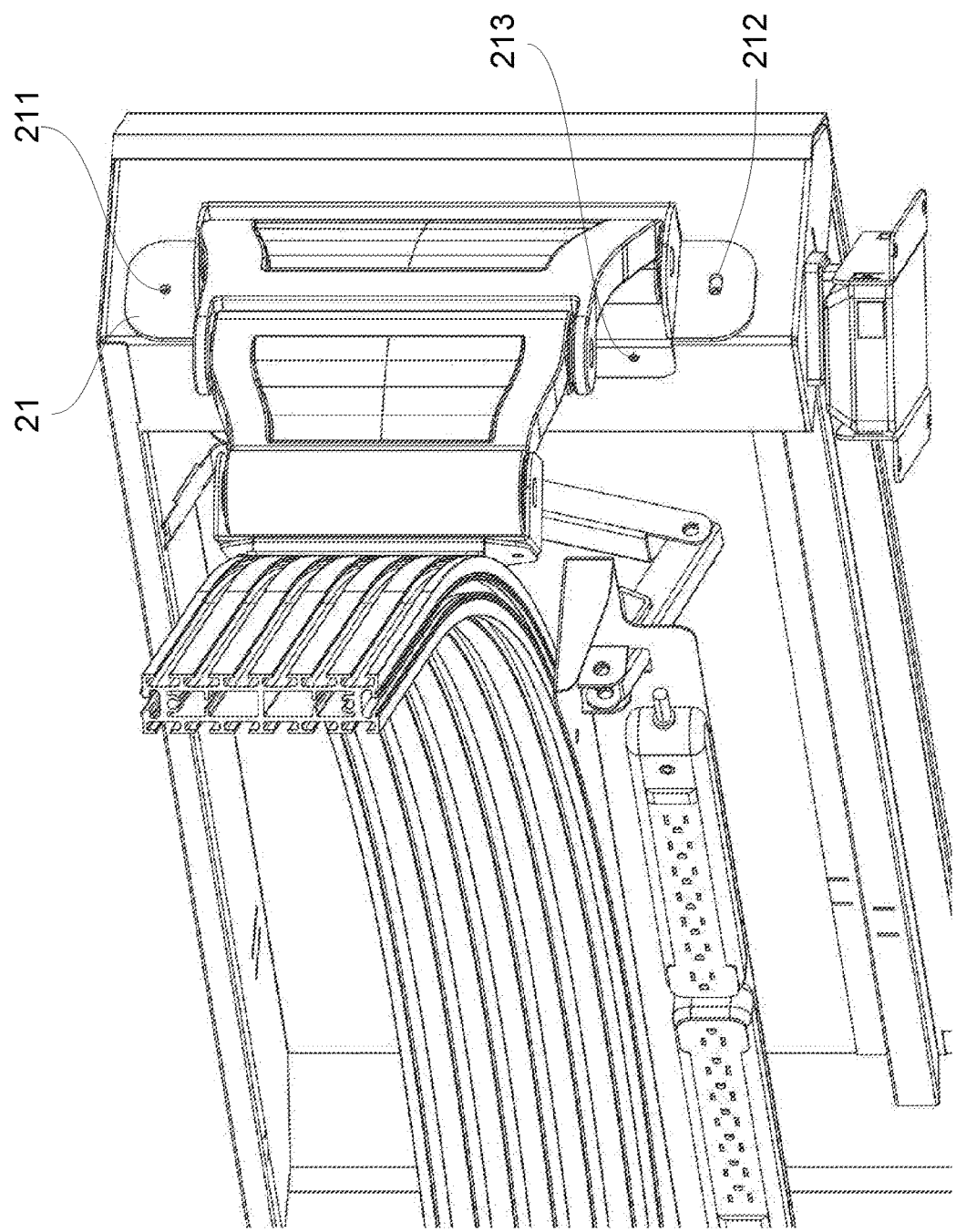
FIG. 11 shows an embodiment of an array support with the ability to tilt.

FIG. 11 shows an embodiment of the array support 100 that is capable of tilting. In some embodiments, each of the foundation attachments 21, which couples the support system 3 to the foundation 2, comprise a foundation joint 206. In some embodiments, the foundation attachment 21 is coupled to the foundation 2 and configured to rotate. In some embodiments, the foundation attachment 21 comprises a pivot 211 and a rotation guide 212. The pivot 211 comprises a connection to the foundation 2 that allows for the rotational movement about the pivot 211. The rotational movement of the foundation attachment 21 equates to the rotation/tilting of the support system 3, and by extension, the rotation/tilting of the structure 1. In some embodiments, the connection of the pivot to the foundation attachment 21 comprises a bolt. The rotation guide 212 comprises a groove wherein a projection, which is coupled to the foundation, resides, at least partially, within the groove. In some embodiments, the groove extends all the way through the foundation attachment 21, and in other embodiments, the projection comprises a portion that extends through the groove and over, e.g., a flange, the foundation attachment to help prevent excess lateral movement of the support system 3. In some embodiments, the groove only extends partially into the foundation attachment 21. The rotation guide 212 can limit the amount of tilt, in either direction, that is available to the support system 3 and the structure 1. Some embodiments, the foundation attachment 21 comprises a position actuator 213. The position actuator 213 enables the user to mechanically set the tilt in the support system. In some embodiments, the position actuator 213 comprises a threaded member that is in the threaded hole, defined by the foundation attachment 21, and abuts the foundation 2. Such that when the threaded member is rotated, it will abut the foundation 2 and cause the foundation attachment 21 to move forward or reverse because of the threaded engagement with the bolt. In some embodiments, gravity will apply a force so that the foundation attachment 21 is naturally biased towards abutment against the foundation. In some embodiments, the position actuator 213 is coupled to the foundation 2 such that the position is fully determined by the position actuator 213 and allow the support system 3 to tilt downward. In embodiments with the ability to tilt downward, the foundation 2 would enable the foundation attachment 21 to rotate past vertical. In some embodiments, the foundation attachment 21 comprises a position locking member (not shown) that will help prevent further rotation of the foundation attachment 21 when the position locking member is engaged. In some embodiments, the position locking member engages a threaded hole of the foundation attachment 21 and is in frictional engagement with the foundation 2.

The embodiments shown and described above are only examples. Even though numerous characteristics and advantages of the present technology have been set forth in the foregoing description, together with details of the structure 1 and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however, it is disclosed that elements of disclosed embodiments can be switched with corresponding elements of embodiments with the same name and/or a number of other disclosed embodiments.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An apparatus comprising:
a structure;
a foundation; and
a support system that couples the structure to the foundation;
wherein the support system comprises two support arms coupled to the foundation, and each support arm comprises a first segment; one or more movement arms coupled to the structure, and each movement arm is coupled to a movement element; the two support arms are configured to pivot in a support plane and the one or more movement arms are configured to pivot in a movement plane, and the support plane intersects the movement plane; the structure is configured to move between a retracted position and an extended position in a substantially linear path; when the structure is moved from the extended position to the retracted position, each first segment rotates away from the foundation; the foundation further comprises at least one foundation attachment that couples the support system to the foundation; each foundation attachment is configured to rotate in relation to the foundation; and rotation of each foundation attachment causes rotation of the support system.

2. The apparatus of claim 1, wherein the structure comprises a curved structure with two or more monitors coupled to the curved structure.

3. The apparatus of claim 1, wherein each first segment defines a first segment curvature.

4. The apparatus of claim 3, wherein the first segment curvature substantially matches a structure curvature.

5. The apparatus of claim 3, wherein each first segment extends out from the foundation, and the first segment curvature extends back toward the foundation.

6. The apparatus of claim 1, wherein each support arm comprises the first segment, defining a first segment curvature, and a second segment defining a second segment curvature.

7. The apparatus of claim 6, wherein the first segment curvature and the second segment curvature substantially match a structure curvature.

8. The apparatus of claim 1, wherein each support arm comprises the first segment and a second segment coupled together by a segment joint.

9. The apparatus of claim 1, wherein the one or more movement arms comprise at least two movements arms that are connected to each other by at least one stabilization bar.

10. The apparatus of claim 1, wherein each foundation attachment comprises a pivot, the pivot couples the foundation attachment to the foundation and allows for rotation of the foundation attachment in relation to the foundation.

11. The apparatus of claim 1, wherein each foundation attachment comprises a rotation guide that interacts with the foundation to limit movement of the foundation attachment in relation to the foundation.

12. The apparatus of claim 1, wherein the two support arms bear substantially all weight of the structure.

\* \* \* \* \*